United States Patent
Kursula

(10) Patent No.: US 7,907,748 B2
(45) Date of Patent: Mar. 15, 2011

(54) METHOD FOR FORMING IMAGES, METHOD FOR TESTING ELECTRONIC DEVICES; AND TEST APPARATUS, TEST CHAMBER AND TEST SYSTEM

(75) Inventor: Mikko Kursula, Oulu (FI)

(73) Assignee: JOT Automation Oy, Oulunsalo (FI)

( * ) Notice: Subject to any disclaimer, the term of this patent is extended or adjusted under 35 U.S.C. 154(b) by 822 days.

(21) Appl. No.: 11/794,880

(22) PCT Filed: Jan. 12, 2006

(86) PCT No.: PCT/FI2006/050019
§ 371 (c)(1),
(2), (4) Date: Jul. 6, 2007

(87) PCT Pub. No.: WO2006/075052
PCT Pub. Date: Jul. 20, 2006

(65) Prior Publication Data
US 2008/0123101 A1    May 29, 2008

(30) Foreign Application Priority Data
Jan. 13, 2005    (FI) ................................. 20055018

(51) Int. Cl.
*G06K 9/00* (2006.01)
(52) U.S. Cl. ....................................................... 382/100
(58) Field of Classification Search .................. 356/450, 356/457; 382/100, 141; 73/570, 649, 655, 73/656; 250/200, 550; 359/1; 348/40, 86, 348/92
See application file for complete search history.

(56) References Cited

FOREIGN PATENT DOCUMENTS

| | | |
|---|---|---|
| DE | 10013299 | 9/2001 |
| EP | 0 325 103 | 7/1989 |
| GB | 2 140 168 A | 11/1984 |
| JP | 08043026 | 2/1996 |

*Primary Examiner* — Samir A Ahmed
*Assistant Examiner* — Atiba O Fitzpatrick
(74) *Attorney, Agent, or Firm* — Hoffmann & Baron, LLP

(57) ABSTRACT

The test system includes an electronic device comprising a camera for forming an image on a detector. A holographic element of the test system and the camera under test of the electronic device are arranged during testing to be placed at a predetermined distance from one another where the holographic element is unfocused in the image field of the camera under test, and the holographic element comprises a holographic test image that is arranged to form a focused image on the detector of the camera operating as desired.

24 Claims, 2 Drawing Sheets

US 7,907,748 B2

METHOD FOR FORMING IMAGES, METHOD FOR TESTING ELECTRONIC DEVICES; AND TEST APPARATUS, TEST CHAMBER AND TEST SYSTEM

CROSS-REFERENCE TO RELATED APPLICATION

This application is a National Phase application of International Application No. PCT/FI2006/050019 filed Jan. 12, 2006, which claims priority based on Finnish Patent Application No. 20055018, filed Jan. 13, 2005, which are incorporated herein by reference.

BACKGROUND OF THE INVENTION

1. Field of the Invention

The invention relates to a method for forming images, a method for testing an electronic device and a test system.

2. Description of the Related Art

The testing of an electronic device is very important before it is delivered for sale. The idea of testing is to ensure that an electronic device, such as a mobile phone, is in perfect working order and structurally faultless. During testing, the electronic device under test can be transferred into a test chamber through a door opening to be connected to a fixture thereof that holds the electronic device under test in position and operates as a user interface for the electronic device. The electronic device is controlled through the fixture and measurement signals are transferred from the electronic device to signal processing equipment.

The fixture may comprise sensors or actuators or the like that allow carrying out various tests. At the end of a test sequence the electronic device, which has undergone testing, is transferred from the test chamber through the door opening and a new electronic device under test is admitted to the test chamber.

What can be tested in an electronic device comprising a camera is the optical properties thereof. Thus the camera may be used to take a test image, which is stored in an image element. The image element is placed at a focusing distance of the camera in order to accurately succeed with the imaging. The shortest faithfully focusing distance from the image element to the camera that does not include an image focusing mechanism may range for instance from 0.5 m to 1.5 m. Such a significant distance between the test image and the camera is very inconvenient especially when manufacturing the device. In addition, owing to the significant distance the test image must be large in order to fill the entire image area of the camera.

A camera provided with a focusing mechanism may also be used to focus a test image nearby, but the focusing always requires a focusing operation as well as time. On the other hand a camera provided with a focusing mechanism is unable to focus at such a short distance as the testing requires, since in a compact test situation the image element cannot typically be placed further than a couple of centimeters from the camera.

SUMMARY OF THE INVENTION

It is an object of the invention to provide an improved method for forming an image, a method for testing the quality of the image and a test chamber, a test apparatus and a test system appropriate for the methods.

This object is achieved with a method for forming an image when testing an electronic device, which comprises a camera for forming an image on a detector. Also in this method a holographic element and a camera under test of the electronic device are placed at a predetermined test distance from one another in order to form an image from the holographic test image on the detector of the camera under test, in which case the image field of the camera under test includes an unfocused holographic element, the holographic test image of which is arranged to form a focused image on the detector of the camera operating as desired.

The invention also relates to a method for testing the quality of the image in an electronic device comprising a camera for forming an image on a detector. In addition the method comprises placing when testing is carried out a holographic element and a camera under test of the electronic device at a predetermined test distance from one another in such a manner that the image field of the camera under test includes an unfocused holographic element, which comprises a holographic test image for forming a focused image on the detector of the camera operating as desired, while the holographic element and the camera operating as desired are placed at a predetermined test distance from one another, forming an image from the holographic test image with the camera under test, and determining the quality of the image formed from the holographic test image of the camera under test.

The invention further relates to a test system arranged to test an electronic device comprising a camera to form an image on a detector. In addition the test system comprises a holographic element, and the holographic element and the camera under test of the electronic device are arranged during testing to be placed at a predetermined distance from one another, where the holographic element is unfocused in the image field of the camera under test, and the holographic element comprises a holographic test image arranged to form a focused image on the detector of the camera operating as desired while the holographic element and the camera operating as desired are placed at a predetermined test distance from one another.

The invention also relates to a test chamber arranged to test an electronic device comprising a camera for forming an image on a detector. Furthermore the test chamber comprises a holographic element, and the holographic element and the camera under test of the electronic device are arranged during testing to be placed at a predetermined distance from one another, where the holographic element is unfocused in the image field of the camera under test, and the holographic element comprises a holographic test image arranged to form a focused image on the detector of the camera operating as desired while the holographic element and the camera operating as desired are placed at a predetermined test distance from one another.

The invention further relates to a test apparatus arranged to test an electronic device comprising a camera to form an image on the detector. Furthermore the test apparatus comprises a holographic element, and the holographic element and the camera under test of the electronic device are arranged during testing to be placed at a predetermined distance from one another, where the holographic element is unfocused in the image field of the camera under test, and the holographic element comprises a holographic test image arranged to form a focused image on the detector of the camera operating as desired while the holographic element and the camera operating as desired are placed at a predetermined test distance from one another.

Preferred embodiments of the invention are disclosed in the dependent claims.

The solution according to the invention provides several advantages. The image element used in testing can irrespective of the focusing distance of the camera be located within the area portrayed with the camera while the actual image remains in the focus of the camera operating as desired. In addition, carrying out the focusing operation of the camera is not necessary although the solution allows it.

BRIEF DESCRIPTION OF THE DRAWINGS

In the following the invention will be described in greater detail by means of the preferred embodiments with reference to the accompanying drawings, in which.

DETAILED DESCRIPTION OF THE PREFERRED EMBODIMENTS

The solution shown is applicable to the testing of a digital camera.

Figure 1:
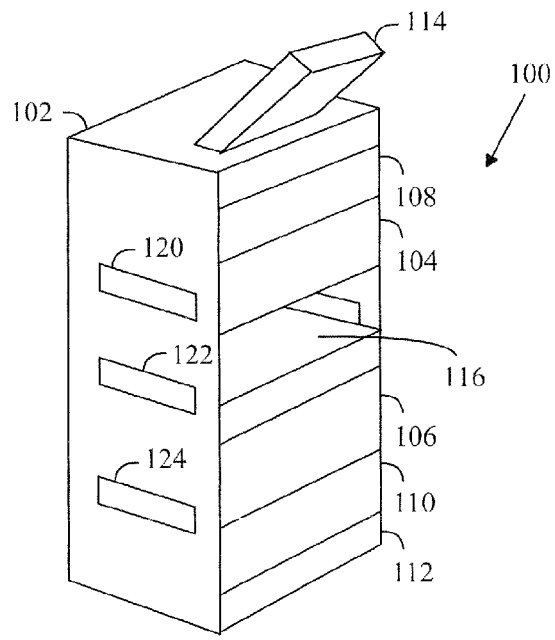
FIG. 1 shows a test system.

Let us first take a closer look at a test system to be used in testing an electronic device as shown in FIG. 1. The test system comprises at least one test apparatus 100 for carrying out testing of electronic devices. The test apparatus 100 may be placed in a test framework 102, for instance in a 19" rack casing, where the marking " refers to an inch which equals 25.4 mm. The test apparatus can also be placed differently. Testing is carried out during the manufacture of the device or at other times before sale. An electronic device can also be tested after sale if desired.

The test framework 102 may comprise for instance two test units 104-106, test apparatuses 108-110, a test controller 112, a monitor 114 and a conveyor 116. The test unit may comprise test apparatuses, a test unit controller, a control bus, a power source etc. (not shown in FIG. 1). The test apparatuses carry out testing of the electronic device under test controlled by the test controller 112 and the unit controller. The unit controller, which may be provided with a microprocessor and appropriate programs, can also be used for pre-processing signals, such as filtering. However, a unit controller is not necessarily required. A test controller 112 may function as the control means of each test unit through the control bus. Both the electronic parts of the test unit and the electronic device under test may receive the electric power employed from the power source of the test unit.

The test apparatus may comprise cabling (not shown in FIG. 1), by which the electronic device under test (DUT) and the test electronics of the test unit are connected to one another through a fixture and a test handler connector interface belonging thereto. Data transmission of the test handler and the test system control is carried out through the cabling.

The electronic devices under test are fed into the test units 104-106 of the test apparatus 100 through door openings 120-124 in the test apparatus structure. The mechanical parts of the fixture enable to fasten the electronic device under test during testing and to establish the possibly required electrical, mechanical and optical connections well enough. The fixture may include sensors, contact surfaces, optical and acoustic components or actuators that allow performing mechanical tests.

In the solution shown the aim is to use the test system to test an electronic device, which comprises a camera to form an image on the detector thereof. The detector may for instance be an element formed of a pixel matrix such as a CCD (Charge-Coupled Device), a CMOS element (Complementary Metal Oxide Semi-conductor) or the like. The electronic device may thus be a camera or the camera may be a part of the electronic device. Let us first take a closer look at FIG. 2, where a prior art solution is described for testing an electronic device 200 comprising a camera 202. An image element 204 comprising a test image 206 is located at such a distance A, 220 from the camera 202 under test that when operating faultlessly the camera 202 under test may focus the test image 206 on the image element 204 on the detector 208 thereof as a sharp image 210. The image element 204 may comprise the material, where the image is placed, the support, background and/or the frame of the image. Two dashed lines 222, 224 show the progress of the beams forming the image 210 from the test image 206 to the detector 208 of the camera 202. Typically the image element 204 is also then focused accurately on the detector 208. The shortest accurately focusing distance 220 from the image element 204 to the camera 202, which does not comprise a focusing mechanism but merely a single focal distance lens 212 may range for instance from 0.5 m to 1.5 m. A camera provided with a single focal distance lens cannot be used to take sharp images closer than this, since if a shorter focal distance of the lens were to be used in order to obtain sharp images at close range, then the objects further off would be portrayed inaccurately or the opening would have to be kept so small that the camera could only be operated in bright light or using an impractically long exposure time. A camera provided with a focusing mechanism may even focus a test image close by, but focusing always requires a focusing operation and time.

Figure 3:
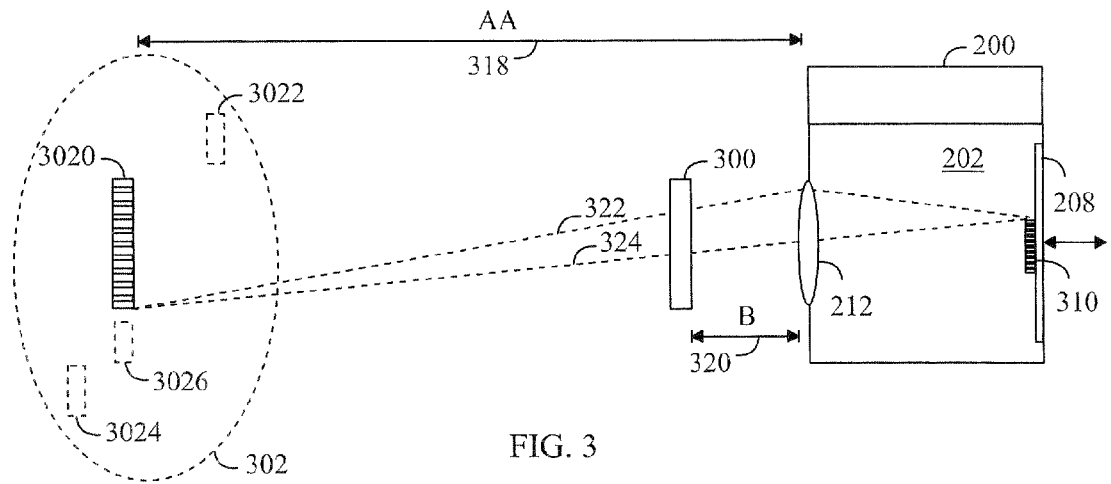
FIG. 3 shows a camera taking holographic test images.

FIG. 3 illustrates a solution in which a holographic element 300 is used as a test apparatus or as a part of the test apparatus located in a test chamber of the test system. The holographic element 300 includes a holographic test image 302, which changes the impression of the distance between the camera 202 and the holographic test image 302.

A holographic image can optically be achieved for a holographic element 300, which is typically plate-like, by focusing on the holographic element 300 coherent optical radiation arriving directly from a laser and optical radiation reflected, scattered or passed through from the object to be imaged. After development the holographic image is ready. A holographic image can also be made by imaging the target using at least two cameras from somewhat different angles and by forming from the obtained images a three-dimensional computer image, from which a hologram can, in turn, be computer-aidedly formed. Thus the holographic image can be printed by means of a holographic printer. Instead of imaging a computer can be used to directly produce (for instance by drawing, image processing) a three-dimensional image, which is converted by means of the computer to a digital hologram and then printed. In this way optical imaging is not necessarily required in making a holographic test image.

The holographic element 300 may comprise a developed emulsion, in which a holographic image formed using optical imaging is stored, a support structure (paper, glass, plastic etc) of the emulsion, and a frame, to which the emulsion and the support structure thereof are fastened.

A mould typically made of metal can also be formed for the hologram. The mould is provided with carved grooves. When the mould is employed to make the holographic element 300 for instance of plastic, the groove pattern is copied on the holographic element 300. The groove pattern of the holographic element 300 in turn changes the phase of the wavefront focused on the holographic element 300 in such a manner that an impression of a three-dimensional test image is created.

Instead of the groove pattern the holographic element 300 can be provided with a diffractive pattern that allows achieving the desired wavefront phase and possibly also an amplitude change for the impression of the three-dimensional test image. The diffractive pattern may comprise for instance binary optics.

The holographic element may also be a computer display and the holographic image therein can be selected from the memory of the computer. The holographic image can then easily and rapidly be changed and the quality of the image formed on the detector of the camera can be tested with several holographic images.

Let us assume at first that the holographic test image 302 is merely formed of a sub-image 3020. When the finished holographic image is studied in appropriate light the pictured target can be shown in the image as a three-dimensional image or in a three-dimensional state, in which case also the depth of the image is presented as desired. The holographic element 300 changes the wavefront of optical radiation in a way that resembles the wavefront arriving from the actual target to the camera 202. This holographically achieved feature in the depth direction can be used to affect the distance 320 between the camera 202 and the holographic test image 3020 (or rather the impression of the distance 320). The physical test distance 320 can holographically be changed to an apparent test distance 318 by means of the holographic test image 3020. Thus a focused image 310 can be formed of the holographic test image 3020 as desired on the detector 208 of the camera 202.

In FIG. 3 the holographic test image 302 with the possible sub-images thereof is drawn with a dashed line into a place, where the holographic element 300 apparently places the test image 302 in relation to the camera 202. Two dashed lines 322, 324 shows the progress of the beams forming the image 310 from the test image 3020 to the detector 208 of the camera 202. Since the lens 212 affects the refraction of the beams 322, 324, for instance the quality, position and location of the lens 212 in relation to the detector 208 play a decisive part as regards the quality of the image 310 formed on the detector 208. The detector 208 and other parts involved in the formation and handling of the image 310 also affect the quality of the image 310 formed with the camera 202.

In testing the holographic element 300 and the camera 202 under test of the electronic device are placed at a predetermined distance B, 320 from one another, where the holographic element 300 is unfocused in the image field of the camera 202 under test. The camera 202 under test may form an image 310 on the detector 208 of the camera 202 under test from the holographic test image 3020, which is apparently placed at a distance AA, 318. The image 310 formed of the holographic test image 3020 is in turn transmitted as an electric signal to the test system. The holographic test image 3020 is made such that the holographic test image 3020 provides the detector 208 of the camera 202 operating as desired a sharply focused image 310, when the holographic element 300 and the camera 202 under test are at a predetermined test distance B from one another.

The holographically obtained apparent test distance AA corresponds to the focusing distance of the camera operating as desired. If in turn the camera 202 under test does not operate as desired in this test, then the image 310 is not sharply focused or the camera does not operate faultlessly. What is avoided with the invention is that the holographic element 300 should be in the focus of the camera or possibly also the fact that the camera 202 should be used to carry out a focusing operation in order to obtain a holographic image as desired in the focus.

The holographic test image 302 may comprise several sub-images 3020 to 3026, which may be placed at the same or at a different apparent distance from the camera 202. If the sub-images 3020 to 3026 are placed at a different apparent distance from the camera 202, it is possible to test the cameras provided with a different focal distance with the same test image 302. Alternatively the focusing distance of the cameras provided with one focal distance can at least approximately be obtained from the fact which one of the sub-images 3020 to 3026 placed at different distances is most sharply imaged with each camera. The different sub-images of the test image 302 also enable to determine the sharpness of the image and the properties of the camera lens. When using several sub-images 3020 to 3026 it is possible to use a holographic element 300 comprising structural sub-elements. Consequently each sub-element may be provided with one or more sub-images of the holographic test image 302.

Figure 2:
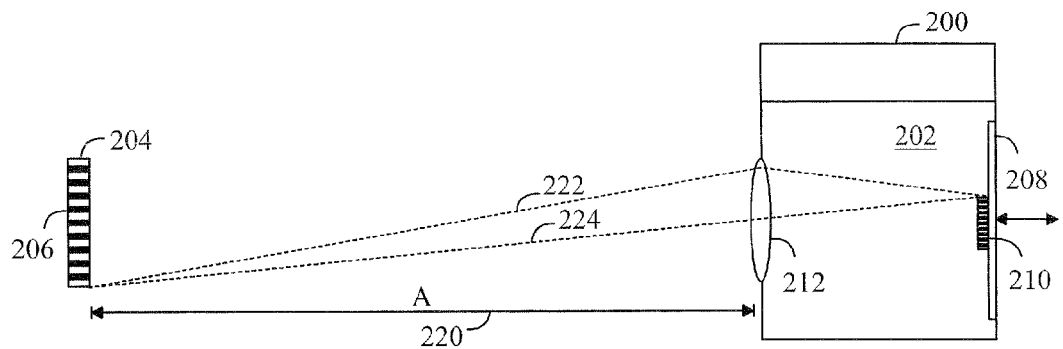
FIG. 2 shows a camera taking a test image at a focusing distance thereof.

Since the holographic test image 302 may be closer than the focusing distance of the camera 202, the holographic test image 302 and the holographic element 300 may in reality be significantly smaller than the test image 206 at the focusing distance of the camera 202 (in FIG. 2). The small test image 302 requires a small holographic element 300 that may be placed very close to the camera 202, for instance a centimeter from the camera or even on the lens of the camera under test.

The camera 202 operating as desired is accepted in the test and the electronic device 200 is therefore ready to proceed for sale. If the camera 202 under test is not faultless, then the image 310 formed on the detector 208 of the camera 202 is not faultless either. If the faults in the image 310 to be formed on the detector 208 exceed a predetermined acceptability limit, the test can be carried out again, the electronic device can be rejected or the electronic device can be amended etc. Still, a too erroneous electronic device should (usually) not be allowed to proceed for sale or should not be used, if a device already in use is concerned.

In the solution shown the quality of the image formed on the detector from the holographic test image of the camera is determined in relation to a perfectly operating camera. Since a perfectly operating camera forms predeterminedly accurately an image on the detector thereof, then the image of the perfectly operating camera and the holographic test image can be considered to correspond to one another completely or at least almost completely. Thus the image of the camera under test can be directly compared with the holographic image and on the basis of the difference between the images the quality of the image of the camera under test can be determined. The quality can be determined in an image processing unit, which may be a unit controller or a test controller of the test system.

What can be checked when testing the quality of the image is whether the camera provides any images at all. If an image is perceived a modular transfer function (MTF) can for instance be used when determining the quality of the image that shows the ability of the camera lens 212 to transfer the contrast of the test image to the image formed on the detector as a function of spatial frequency. Instead of or in addition to this the quality of the image can be determined by measuring the resolution capability of the lines in the line pattern possibly functioning as the test image. Furthermore different aberrations such as spherical aberration, astigmatism, coma error, the flexure/curvature of the image surface, marking error (barrel, cushion), discolouration, depth of field, depth of focus etc. Other image quality definitions and/or definition methods can also be used. The quality of the image allows determining for instance the positioning of the objective lens/lenses of the camera and the dead pixels of the pixel matrix. What can be used as the test image are a grate, dots, circles, graphic patterns or combinations thereof. Also landscapes, portraits and article images can be used as test images. If the image quality of the camera is not of a desired quality, it can be deduced that there is something wrong with the camera.

White light or another band of the desired optical radiation can be used for illuminating the holographic image. The band of the illuminating optical radiation may be narrow or broad, from monochromatic radiation to several dozens of nanometers. The narrowband radiation may also be coherent and possibly also collimated. The optical radiation illuminating the holographic image may be focused on the holographic image from the front or from behind.

Figure 4:
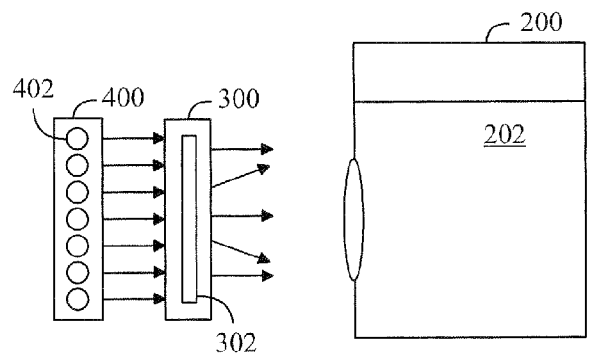
FIG. 4 shows illuminating the test image from behind.

FIG. 4 shows the illumination of the holographic element. An optical power source 400 may comprise one or more light emitting diodes 402, which illuminate the holographic element 300 from the behind in relation to the camera 202 of the electronic device 200. Instead of a light emitting diode or light emitting diodes one or more glowing filament or discharge lamps or lasers can be employed. Daylight is also possible on several occasions. The optical radiation that has passed the holographic element 300 proceeds to the camera 202, which forms an image from the holographic test image 302 stored in the holographic element 300 (in this Figure the test image 302 is located in the holographic element 300 and not to the apparent position thereof as shown in FIG. 3).

Figure 5:
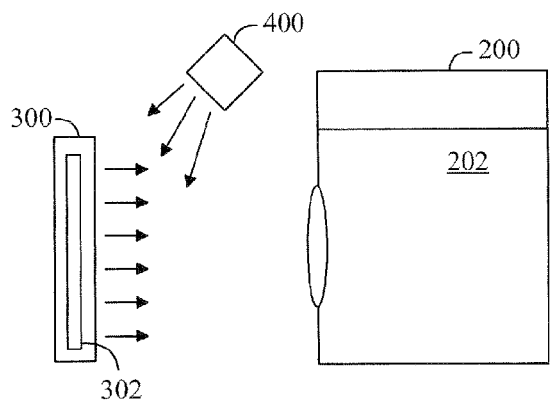
FIG. 5 shows illuminating the test image from the front.

FIG. 5 shows a solution in which the illumination is focused on the holographic element 300 from the front. Also in this case the optical power source 400 may comprise one or more light emitting diodes, a filament lamp, a discharge lamp or a laser. Daylight is a possibility in this solution too. The optical radiation reflected from the holographic element 300 proceeds to the camera 202, which forms an image from the holographic test image 302 stored in the holographic element 300. In the solution shown in FIGS. 4 and 5 the optical power source 400 may be structurally integrated into the holographic element 300.

Figure 6:
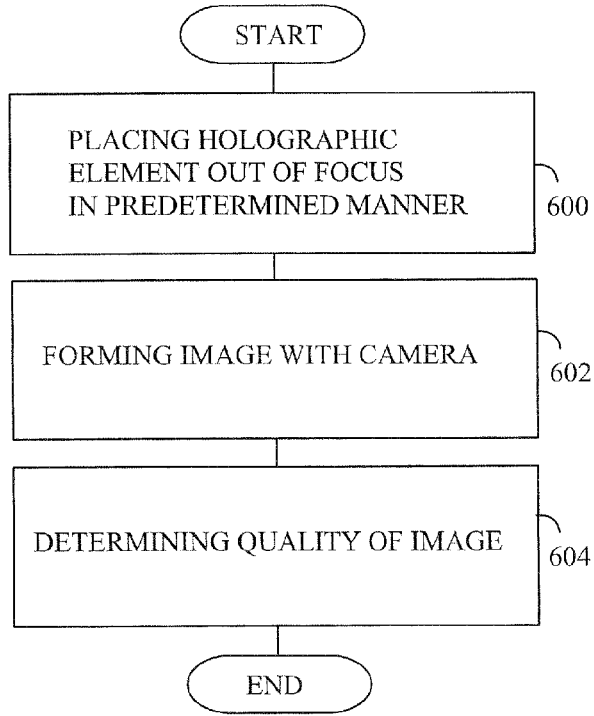
FIG. 6 shows a flow chart of the method.

FIG. 6 shows a flow chart of the method. In step 600 the holographic element and the camera under test of the electronic device is placed at a predetermined test distance from one another in order to form an image from the holographic test image on the detector of the camera under test in such a manner that the holographic element is unfocused in the image field of the camera under test. In addition to this step testing can be continued in step 602, in which the camera 202 under test forms an image from the holographic test image on the detector thereof. Furthermore if it is desired to know how well the camera operates, step 604 may be carried out, in which the quality of the image formed from the holographic test image of the camera under test on the detector is determined.

Even though the invention has above been described with reference to the examples according to the accompanying drawings it is apparent that the invention is not restricted thereto but can be modified in various ways within the scope of the accompanying claims.

The invention claimed is:

1. A method for forming an image when testing an electronic device comprising a camera for forming an image on a detector, the method comprising placing a holographic element, comprising a holographic test image, and a camera under test of the electronic device at a predetermined test distance from one another in order to form the image from the holographic test image on the detector of the camera under test, whereby the image field of the camera under test includes an unfocused holographic element, the holographic test image of which is arranged to form a focused image on the detector of the camera operating as desired.

2. A method for testing the quality of an image in an electronic device comprising a camera for forming an image on a detector, the method comprising:

placing when testing is carried out a holographic element and a camera under test of the electronic device at a predetermined test distance from one another in such a manner that the image field of the camera under test includes an unfocused holographic element, which comprises a holographic test image for forming a focused image on the detector of the camera operating as desired, while the holographic element and the camera operating as desired are placed at a predetermined test distance from one another;

forming an image from the holographic test image with the camera under test; and determining the quality of the image formed from the holographic test image of the camera under test.

3. A method as claimed in claim 1, the method further comprising changing the physical test distance holographically to an apparent test distance in order to form the focused image from the holographic test image on the detector of the camera operating as desired.

4. A method as claimed in claim 1, the method further comprising using optical radiation to illuminate the holographic element in order to form the holographic test image.

5. A method as claimed in claim 1, the method further comprising illuminating the holographic element with at least one light emitting diode.

6. A method as claimed in claim 1, the method further comprising illuminating the holographic element with an optical power source, which is structurally integrated into the holographic element.

7. A method as claimed in claim 1, wherein the holographic test image comprises sub-images placed at various apparent test distances.

8. A method as claimed in claim 1, the method further comprising placing the holographic element and the camera under test of the electronic device at a distance from one another that is shorter than the focusing distance of the camera.

9. Test system arranged to test an electronic device comprising a camera for forming an image on a detector, the test system comprising a holographic element, and the holographic element and the camera under test of the electronic device are arranged during testing to be placed at a predetermined distance from one another, where the holographic element is unfocused in the image field of the camera under test, and the holographic element comprises a holographic test image arranged to form a focused image on the detector of the camera operating as desired while the holographic element and the camera operating as desired are placed at a predetermined test distance from one another.

10. A test system as claimed in claim 9, wherein while the camera under test forms an image from the holographic test image on the detector of the camera under test, the test system is arranged to determine the quality of the image formed from the holographic image of the camera under test.

11. A test system as claimed in claim 9, wherein the holographic test image is arranged to change the physical test distance to an apparent test distance that corresponds to the focusing distance of the camera operating as desired.

12. A test system as claimed in claim 9, wherein the test system comprises an optical power source for illuminating the holographic element with optical radiation.

13. A test system as claimed in claim 12, wherein the optical power source comprises at least one light emitting diode.

14. A test system as claimed in claim 12, wherein the optical power source is structurally integrated into the holographic element.

15. A test system as claimed in claim 9, wherein the holographic test image comprises sub-images placed at various apparent test distances.

16. A test system as claimed in claim 9, wherein the test system is arranged to place the holographic element and the camera under test of the electronic device at a distance from one another that is shorter than the focusing distance of the camera.

17. A test chamber arranged to test an electronic device comprising a camera for forming an image on a detector, the test chamber comprising a holographic element, and the holographic element and the camera under test of the electronic device are arranged during testing to be placed at a predetermined distance from one another, where the holographic element is unfocused in the image field of the camera under test, and the holographic element comprises a holographic test image arranged to form a focused image on the detector of the camera operating as desired while the holographic element and the camera operating as desired are placed at a predetermined test distance from one another.

18. A test apparatus arranged to test an electronic device comprising a camera for forming an image on a detector, the test apparatus comprising a holographic element, and the holographic element and the camera under test of the electronic device are arranged during testing to be placed at a predetermined distance from one another, where the holographic element is unfocused in the image field of the camera under test, and the holographic element comprises a holographic test image arranged to form a focused image on the detector of the camera operating as desired while the holographic element and the camera operating as desired are placed at a predetermined test distance from one another.

19. A method as claimed in claim 2, the method further comprising changing the physical test distance holographically to an apparent test distance in order to form the focused image from the holographic test image on the detector of the camera operating as desired.

20. A method as claimed in claim 2, the method further comprising using optical radiation to illuminate the holographic element in order to form the holographic test image.

21. A method as claimed in claim 2, the method further comprising illuminating the holographic element with at least one light emitting diode.

22. A method as claimed in claim 2, the method further comprising illuminating the holographic element with an optical power source, which is structurally integrated into the holographic element.

23. A method as claimed in claim 2, wherein the holographic test image comprises sub-images placed at various apparent test distances.

24. A method as claimed in claim 2, the method further comprising placing the holographic element and the camera under test of the electronic device at a distance from one another that is shorter than the focusing distance of the camera.

* * * * *